Feb. 16, 1932.   R. W. CURTIS ET AL   1,845,012
ADJUSTABLE EQUALIZER FULCRUM DEVICE
Filed March 25, 1931   2 Sheets-Sheet 1
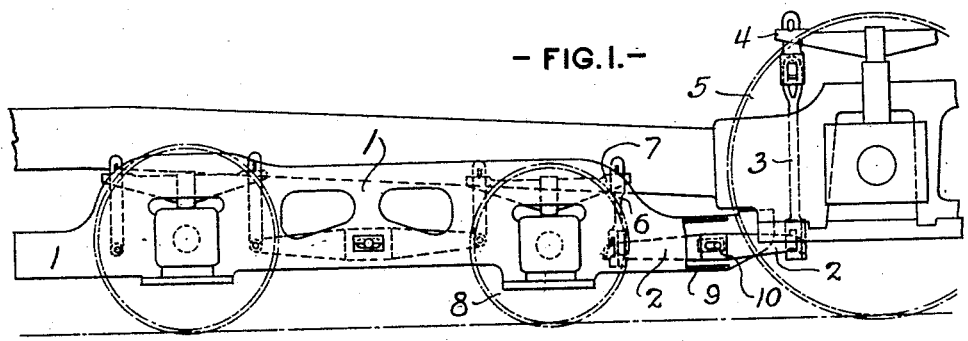
- FIG. 1.-
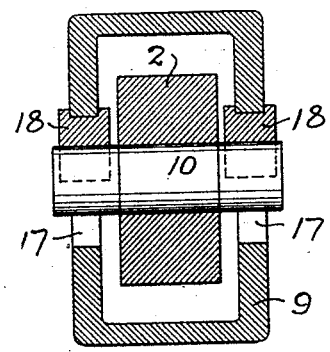
- FIG. 3.-
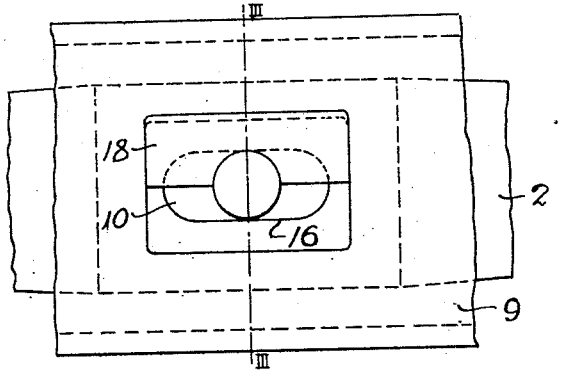
- FIG. 2.-
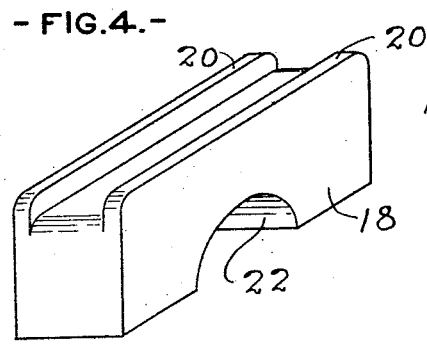
- FIG. 4.-
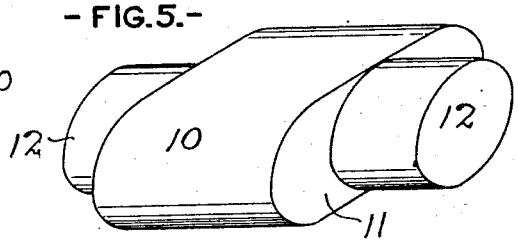
- FIG. 5.-
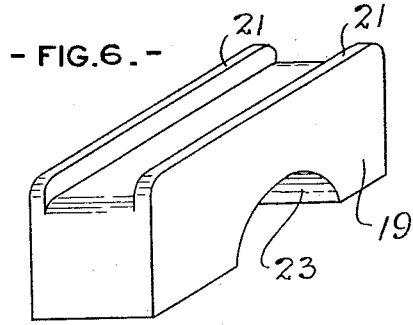
- FIG. 6.-
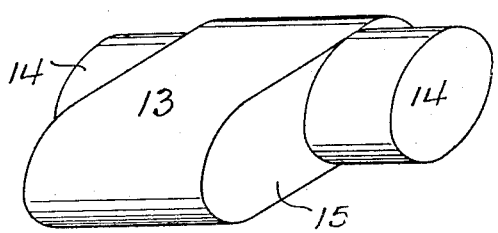
- FIG. 7.-
INVENTORS
Robert W. Curtis
BY Thomas H. Ainsworth
ATTORNEY Feb. 16, 1932.  R. W. CURTIS ET AL  1,845,012
ADJUSTABLE EQUALIZER FULCRUM DEVICE
Filed March 25, 1931   2 Sheets-Sheet 2
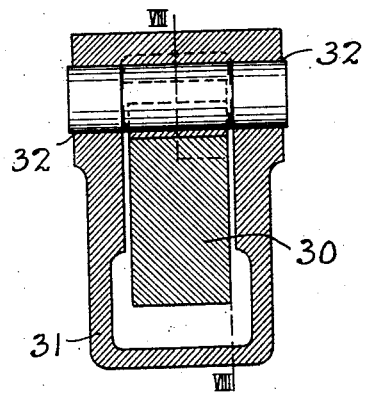
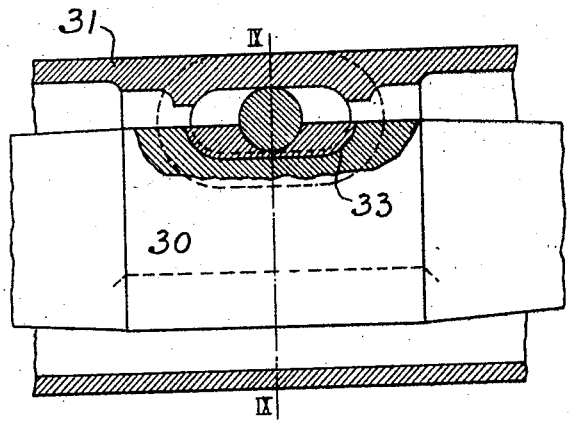
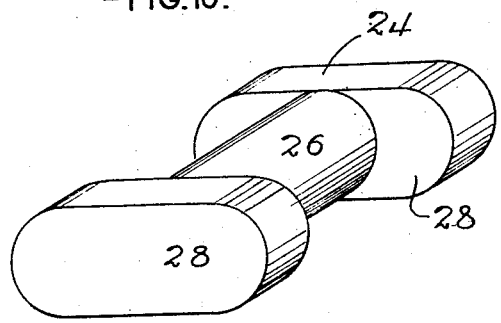
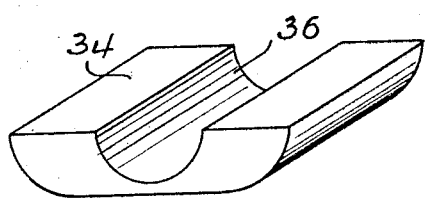
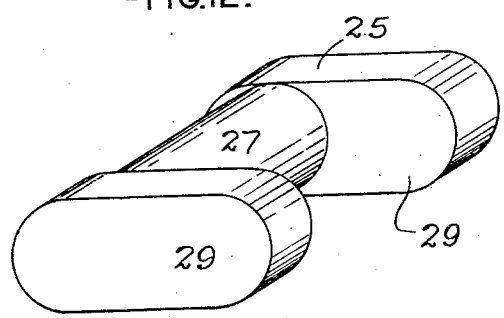
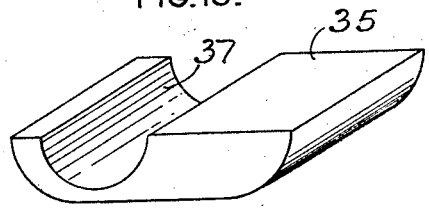
INVENTORS
Robert W. Curtis.
BY Thomas H. Ainsworth
ATTORNEY Patented Feb. 16, 1932

1,845,012

UNITED STATES PATENT OFFICE

ROBERT W. CURTIS, OF DUNKIRK, AND THOMAS H. AINSWORTH, OF SCHENECTADY, NEW YORK

ADJUSTABLE EQUALIZER FULCRUM DEVICE

Application filed March 25, 1931. Serial No. 525,146.

This invention relates generally to the class of appliances known as "spring rigging equalizers for locomotives", and particularly to equalizers adapted for use with the spring riggings of four wheel locomotive trucks.

In the spring suspension systems of locomotive trucks and driving wheels it is desirable to provide means for readily adjusting the same to increase or decrease the proportionate amount of weight respectively borne by the truck and the driving wheels. In the use of two wheel locomotive trailing trucks of the various standard designs, the length of the spring equalizing levers is sufficiently great to permit a plurality of longitudinally spaced holes to be formed therein, through which the equalizer fulcrum pin may be passed. The proportion of weight borne by the truck and the spring system of the rear driving wheels may be then varied as desired, by changing the location of the pin from one hole to another.

However, where four wheel trailing trucks, such as have recently been extensively adopted, are employed, the equalizing levers, under the necessary conditions of design, are of substantially shorter lengths and consequently a much smaller change in the location of the fulcrum pin effects the desired transfer of weight. The necessary variation is in fact so slight that the use of fulcrum pin holes is impractical, since they would necessarily overlap each other.

The object of the present invention is to provide a simple and inexpensive appliance which will be readily applicable to the equalizers in usual service after slight alterations, and by which a relatively finer adjustment of their fulcrum may be effected to increase or decrease, as desired, the proportionate amounts of weight borne respectively by the spring suspension systems of the truck and the driving wheels.

In the accompanying drawings, illustrating specific embodiments of the invention: Figure 1 is a partial side view of the back end of a locomotive frame with the invention applied thereto; Fig. 2, an enlarged fragmental side view of the equalizer and its fulcrum in the truck frame; Fig. 3, a section on the line III—III of Fig. 2; Fig. 4, an isometric view of an equalizer pivot bearing; Fig. 5, an isometric view of an equalizer pivot; Figs. 6 and 7, views similar to Figs. 4 and 5 respectively, showing the trunnion seat of the bearing and the trunnions of the pivot offset from the respective centers of the same; Figs. 8 to 13 show modified forms of the invention, Fig. 8 being a fragmental side view partly in section of the equalizer and pivot in the frame, and being taken on the line VIII—VIII of Fig. 9; Fig. 9, a section on the line IX—IX of Fig. 8; Fig. 10, an isometric view of the pivot shown in Figs. 8 and 9; Fig. 11, an isometric view of a correspondingly modified pivot bearing; and Figs. 12 and 13, show a modified form of pivot and bearing, respectively, with the bearing portion of the pivot and the seat of the bearing offset from the respective center lines of the same.

In the practice of the invention, referring descriptively to a specific embodiment of the same which is herein exemplified as applied in connection with a four wheel locomotive trailing truck, indicated by the numeral 1, the forward end of the equalizing lever 2, for the spring rigging on one side of the locomotive is connected, in the usual manner, through an intermediate linkage, to the adjacent hanger 3, of the spring 4, of the rear pair of locomotive driving wheels 5, (only one being shown). The rear end of the equalizer 2, is connected to the forward hanger 6, of the spring 7, of the forward pair of wheels 8, of the trailing truck. The equalizer 2, passes through the hollow side frame member 9, of the truck 1. The pivot 10, (Fig. 5) comprises a body portion, 11, and trunnions 12 centrally formed integral therewith and in line with each other on opposite sides of the same. The pivot 13, shown in Fig. 7, is similarly shaped except that the trunnions 14, are formed at the end of the body portion 15. A longitudinal slot 16, is formed in the equalizing lever 2, and the pivots are adapted to fit within the slot, their trunnion portions extending through openings 17, formed in the frame 9. Bearing members, 18 and 19, for the pivots, 10 and 13, respectively, are provided on their upper sides with flanges, 20 and 21, and with grooves, 22 and 23, formed in their lower sides, the groove 22, being centrally located in the bearing 18, and the groove 23, being offset from the center of the bearing 19, respectively, to correspond with the trunnions of the pivots 10 and 13. The bearing members are adapted to be inserted in the openings 17, of the frame, so that their flanges will engage the upper wall of the same to prevent their lateral displacement, and their grooves, 22 and 23, will embrace the upper sides of the trunnions, 12 and 14, respectively, to provide a seat for the same when they are in adjusted operable position.

It will be apparent that by the use of the two different pivots and their respective bearings, three different fulcrum adjustments will be possible within a relatively small space. The pivot, 10, and bearing, 18, (Figs. 5 and 4) will of course afford a centrally located fulcrum position. Upon removing these parts and inserting the pivot 13, and bearing 19, (Figs. 7 and 6) a fulcrum position offset in one direction from the central position will be effected, and by reversing the positions of the latter pivot and bearing, that is to say turning the same about, end for end, a fulcrum position offset from the central position in the other direction will be effetced.

In the modified construction of the invention shown in Figs. 8 to 13 inclusive, the pivots, 24 and 25 (Figs. 10 and 12) are formed with bearing portions, 26 and 27, within the oppositely positioned side elements, 28 and 29, respectively. The bearing portion, 26, of pivot 24 (Fig. 10), is centrally located between the side elements, 28, and the bearing portion, 27, of pivot, 25, is located between the ends of the side elements, 29. These pivots are adapted to be positioned between the equalizing lever, 30, and the upper side of the frame member, 31, the side elements being held in openings, 32, formed in the sides of the frame member. The width of the bearing portions are substantially the same as the distance between the sidewalls of the frame, and the widths of the side elements are substantially the same as the thickness of the walls of the frame. A recess, 33, is formed in the upper side of the equalizing lever, 30, and bearing blocks, 34 and 35, are shaped to fit therein. The bearing blocks are provided with grooves, 36 and 37, respectively, on their upper sides, the groove, 36, being centrally located in the bearing block, 34, and the groove, 37, being located at the end of the bearing block, 35, to correspond with the bearing portions, 26 and 27, of the respective pivots, so as to provide a seat for the bearing portions of the same and to prevent their lateral displacement when in operable position between the frame, 31, and the equalizing lever, 30. When one of the bearing blocks has been placed in the desired position, it is welded in the recess, 33.

It will be seen that in this modified construction the recess, 33, takes the place of an opening in the equalizing lever and that the frame member rests upon the pivot which in turn is borne by the equalizing lever, the bearing block being secured in the recess on the upper side of the lever, thereby maintaining its adjusted position. By the use of the respective modified pins and bearings, three different fulcrum adjustments may be effected; the pivot, 24, and bearing block, 34, providing the centrally located fulcrum, and the pivot, 25, and bearing block, 35, a fulcrum offset to one or the other side of the center accordingly as they are placed between the equalizing lever and truck frame; the distribution and weight between the truck and the driving wheel spring suspension being adjustable thereby.

While there is hereinbefore described specific embodiments of this invention, various changes and modifications in the details of construction may prove desirable, and will be apparent to those skilled in the art, and it is to be understood that all and any such changes and modifications are contemplated as within the spirit of this invention and the scope of the appended claims. It will also be apparent that while this invention has been described herein as embodied in a locomotive spring rigging, the same may be employed in any apparatus where an adjustable pivot member will prove desirable.

The invention claimed and desired to be secured by Letters Patent is:

1. A spring rigging comprising springs, an equalizing lever between springs of said rigging, and a fulcrum pivot for said lever, having a horizontal, elongated body maintaining the position of the fulcrum pivot and a pivot pin formed integrally with the body, and elongated segmental bearing means for said pivot pin.

2. In a locomotive, the combination of an equalizing lever for transmitting weight, a frame member supported thereby, and a fulcrum pivot for said lever having a pivot pin and a horizontal, elongated body holding said pivot pin in position, and elongated segmental bearing means for said pivot pin.

3. In a locomotive, the combination of a trunk frame, a driving wheel system, an equalizing lever for transmitting weight between said frame and driving wheel system, an adjustable fulcrum pivot for said lever having a horizontal, elongated body maintaining the adjusted position of the fulcrum pivot and a pivot pin formed integrally with the body, and elongated segmental bearing means for said pivot pin.

4. A spring rigging comprising springs, an equalizing lever between springs of said rigging having a horizontal, elongated opening formed therein, and a fulcrum pivot for said lever having a horizontal, elongated body disposed within said opening maintaining the position of the fulcrum pivot and a pivot pin formed integrally with the body, and elongated segmental bearing means for said pivot pin.

5. In a locomotive, the combination of a truck frame, a driving wheel system, an equalizing lever for transmitting weight between said frame and driving wheel system, said lever having a horizontal, elongated opening formed therein, a fulcrum pivot for said lever having a horizontal, elongated body disposed within said opening holding said fulcrum pivot in position and a pivot pin formed integrally with said body, and elongated segmental bearing means for the upper portion of said pivot pin, engaging said frame.

6. A spring rigging comprising springs, an equalizing lever between springs of said rigging for transmitting weight and supporting a frame member, a fulcrum pivot for said lever having a horizontal, elongated body engaging said lever and maintaining the position of the fulcrum pivot and trunnions formed integrally with and disposed on the opposite sides of said body in line with each other, and elongated segmental bearing means for said trunnions adapted to engage a frame member.

7. In a locomotive, the combination of a truck frame, a driving wheel system, an equalizing lever for transmitting weight between said frame and driving wheel system, said lever having a horizontal, elongated opening formed therein, an adjustable fulcrum pivot for said lever having a horizontal, elongated body disposed within said opening maintaining the position of said fulcrum pivot and trunnions formed integrally on the opposite sides of said body, in line with each other, and elongated segmental bearing means for the upper portion of said trunnions, engaging said truck frame.

8. A spring rigging comprising springs, an equalizing lever between springs of said rigging for transmitting weight and supporting a frame member, an adjustable fulcrum pivot for said lever having a horizontal, elongated body maintaining the position of the fulcrum pivot and adapted for end to end reversal, a pivot pin formed integrally with and off-set from the center of said body, and elongated, segmental, adjustable bearing means for said pivot pin, adapted for end to end reversal and adapted for engagement with a frame member.

9. In a locomotive, the combination of a truck frame, a driving wheel system, an equalizing lever for transmitting weight between said frame and driving wheel system, said lever having a horizontal, elongated opening formed therein, a fulcrum pivot for said lever having a horizontal, elongated body disposed within said opening, maintaining the position of said fulcrum pivot, and adapted for end to end reversal and a pivot pin formed integrally with and off-set from the center of said body, and elongated segmental bearing means for the upper portion of said pivot pin, engaging said frame and adapted for end to end reversal.

10. In a locomotive, the combination of a truck frame, a driving wheel system, an equalizing lever for transmitting weight between said frame and driving wheel system, said lever having a horizontal, elongated opening formed therein, an adjustable fulcrum pivot for said lever having a horizontal, elongated body disposed within said opening adapted for end to end reversal and trunnions formed integrally on the opposite sides of said body in line with each other and offset from the center of said body, and elongated segmental bearing means for the upper portion of said trunnions, engaging said frame, and adapted for end to end reversal.

11. In a locomotive, the combination with a truck frame and a driving wheel system, of an equalizing lever for transmitting weight between said frame and said driving wheel system, said lever having an opening formed therein, an adjustable fulcrum pivot for said lever having an enlarged body disposed within said opening and trunnions formed on the opposite sides of said body in line with each other, said truck frame comprising parallel side members spaced apart on opposite sides of the said lever and having openings formed therein, the said pivot trunnions extending through said openings, and adjustable bearing members disposed in said openings between the said trunnions and frame member providing bearing seats for said trunnions.

12. In a locomotive, the combination with a truck frame and a driving wheel system, of an equalizing lever for transmitting weight between said frame and said driving wheel system, said lever having an opening formed therein, an adjustable fulcrum pivot for said lever having an enlarged body disposed within said opening and trunnions formed on the opposite sides of said body in line with each other, said truck frame comprising parallel side members spaced apart on opposite sides of said lever and having openings formed therein, said trunnions extending through said openings, adjustable bearing members disposed in said openings between said trunnions and frame member, providing bearing seats for said trunnions, and means on said bearing members for preventing the transverse displacement of the same.

13. A spring rigging comprising springs, an equalizing lever between springs of said rigging for transmitting weight and supporting a frame member, a fulcrum pivot for said lever having a horizontal, elongated body maintaining the position of the fulcrum pivot, and adapted for end to end reversal and trunnions formed integrally on the opposite sides of said body in line with each other and offset from the center of the body, and horizontal, elongated bearing members adapted for end to end reversal, and having segmental bearing surfaces formed therein off-set from the centers of the members for said trunnions, said bearing members being adapted to engage a frame member.

14. A spring rigging comprising springs, an equalizing lever between springs of said rigging, a fulcrum pivot for said lever having a horizontal, elongated body, adapted for end to end reversal, maintaining the position of the fulcrum pivot and trunnions integrally formed on the opposite sides of said body in line with each other and offset from the center of the body, horizontal, elongated bearing members adapted for end to end reversal and having segmental bearing surfaces formed therein, offset from the centers of said bearing members, for said trunnions, and engaging means on said bearing members for preventing the lateral displacement of the bearing members, said bearing members being adapted for end to end reversal.

15. A spring rigging comprising springs, an equalizing lever between springs of said rigging, and a fulcrum pivot for said lever comprising oppositely disposed horizontal, elongated side elements and a pivot disposed between and formed integral with said elements.

16. In a spring rigging, an equalizing lever between springs of said rigging, said lever having a recess formed in its upper side, a bearing seat disposed in said recess, said seat having a groove formed in its upper side, and a fulcrum pivot for said lever comprising oppositely disposed side elements and a bearing carried between the said side elements and operably disposed in said bearing seat groove.

17. In a spring rigging, an equalizing lever between springs of said rigging, said lever having a recess formed on its upper side, a bearing seat disposed in said recess, said seat having a groove formed in its upper side, offset from the center of the same, an adjustable fulcrum pivot for said lever comprising oppositely disposed side elements and a bearing carried between said side elements offset from the centers of said side elements, the said pivot being operably disposed in said bearing seat groove.

18. In a locomotive, the combination with a truck frame and driving wheel system, an equalizing lever for transmitting weight between said frame and driving wheel system, said lever having a recess formed on the upper side thereof, a seat member rigidly secured in said recess having a groove formed on its upper side, said frame comprising a tubular body, having openings formed in its opposite sides, the said lever passing longitudinally through said tubular body, a fulcrum pivot for said lever comprising oppositely disposed side elements disposed within said frame member openings, and a bearing carried between said side elements and disposed in said bearing seat groove between the seat member and frame.

19. In a locomotive, the combination with a truck frame and a driving wheel system, an equalizing lever for transmitting weight between said frame and driving wheel system, said lever having a recess formed on the upper side thereof, a seat member disposed in said recess having a groove formed on its upper side offset from the center of the same, said frame comprising a tubular body having openings formed on its opposite sides, the said lever passing longitudinally through the said tubular body, a fulcrum pivot for said lever comprising side elements disposed within said frame openings, and a bearing carried between said side elements offset from the center of same and disposed in said bearing seat groove between said seat and frame member.

ROBERT W. CURTIS.
THOMAS H. AINSWORTH.